United States Patent Office 3,717,830
Patented Feb. 20, 1973

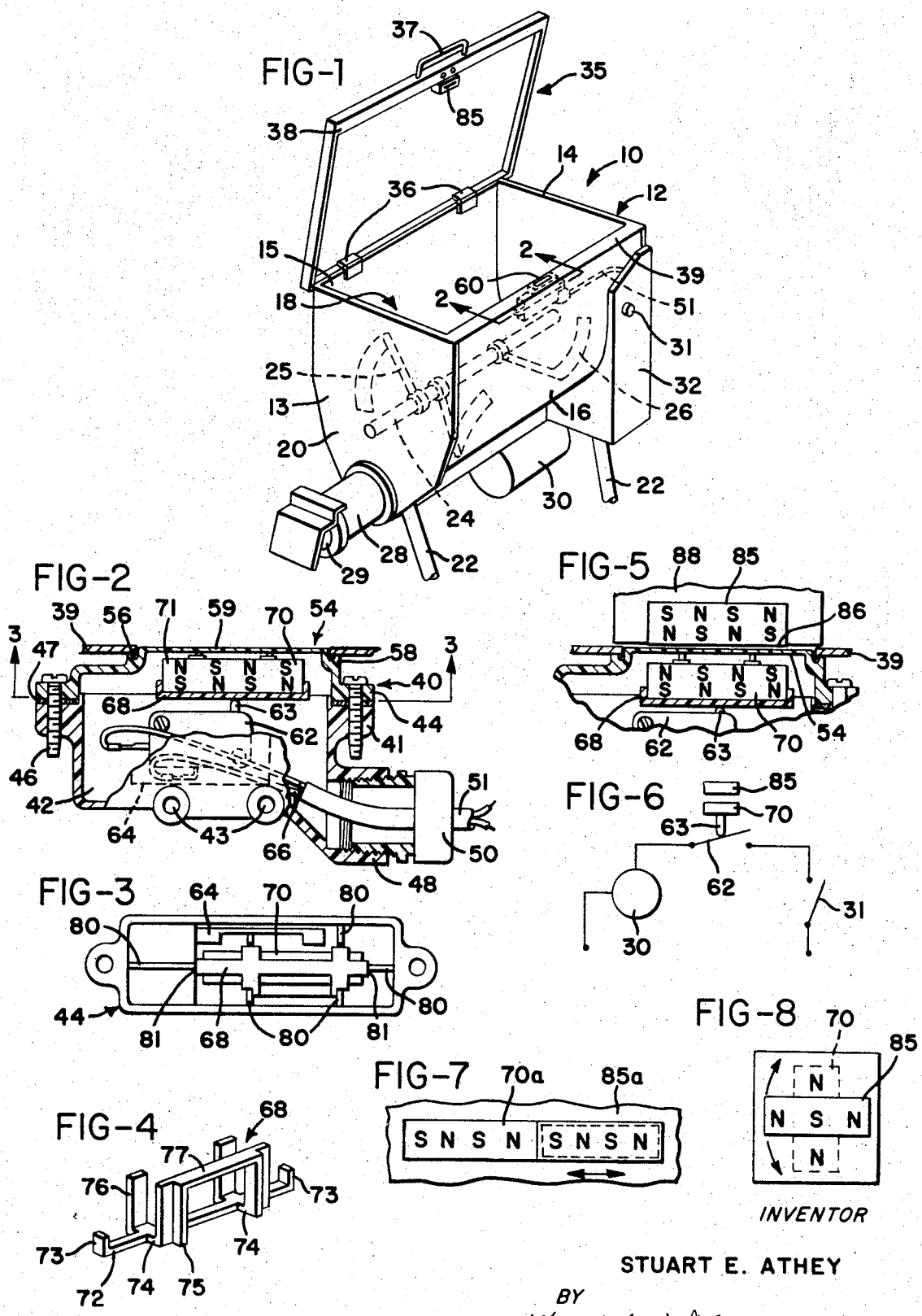

3,717,830
MAGNETIC SWITCH CONTROL AND
INTERLOCK SYSTEM
Stuart E. Athey, Troy, Ohio, assignor to The Hobart
Manufacturing Company, Troy, Ohio
Filed July 29, 1971, Ser. No. 167,404
Int. Cl. H01h 36/00
U.S. Cl. 335—207    15 Claims

ABSTRACT OF THE DISCLOSURE

A first magnet is removably mounted in a water-tight case to actuate a switch therein, and the case may be mounted on the housing of an appliance or the like. A second magnet is movably mounted outside the case, as on a cover for closing the housing. The magnets are multi-pole magnets, each having at least three poles arranged in alternating relation along an operative surface, and are effective when the second magnet is properly oriented on the case to establish a unique force effective to move the first magnet to actuate the switch.

BACKGROUND OF THE INVENTION

In magnetic interlock systems, commonly a single or two pole magnet system which operates by attraction or repulsion is used. When a cover is closed on the housing of an appliance, or of other machinery in which a cover encloses dangerous operating equipment, one magnet on the cover moves another magnet on the housing to a position where it actuates a safety interlock switch so that the appliance may be started.

It has been found that such an interlock can be deliberately defeated by moving a simple bar magnet to the proper position to actuate the interlock switch, and by taping or otherwise fastening the magnet in place, effectively neutralizing the magnetic interlock. Hence, such systems will not insure that the cover is closed before the equipment may be operated, if someone wants deliberately to disable the safety feature. Additionally, many interlock and similar switch systems are not water-tight, and consequently are not capable of being used for appliances such as food mixing and grinding machines, dishwashing machines and the like which have moist environments or are periodically rinsed out with water.

SUMMARY OF THE INVENTION

The present invention is directed to an improved magnetic switch and an interlock system especially useful for controlling and for safeguarding appliances or equipment wherein a cover encloses dangerous rotary blades or the like mounted in a housing. In general, the invention provides a magnetic interlock system which is not capable of being defeated by a simple bar magnet and which provides a greater degree of safety than has heretofore been possible. At the same time the invention provides a water-tight switch control arrangement especially suitable for food mixing machines, dishwashing machines and other similar equipment.

In the preferred embodiment, a first magnet is movably mounted within a water-tight case adjacent a switch mounted within the case and including a movable actuator. The case is mounted on the housing and includes a non-ferrous portion through which the first magnet's lines of force can permeate. A second magnet is mounted on the cover in a position in which it is brought into close proximity with the non-ferrous portion of the housing when the cover is closed or seated on the housing. Both magnets are of the polarized type, having at least three poles arranged in alternating relation adjacent an outer operative surface. The second magnet is positioned such that, when it is moved into proximity with the non-ferrous portion of the case, its poles oppose the poles of the first magnet and create a direct repulsion force effective to move the first magnet against the actuator to operate the switch. It is also possible to create a direct attraction force in similar manner, by reversing the polarity of the poles in the second magnet. However, where safety control is a factor the attraction system is inadvisable since it could be defeated with a ferrous metal shorting or pole piece.

The first magnet is preferably received within a saddle, and the saddle mounted within the case and supported by the actuator, the weight of the magnet and saddle being ineffective to operate the actuator. The saddle has a series of arms extending vertically around the magnet, and the housing has a corresponding series of guide ribs therein which serve to guide the vertical movement of the saddle within the case.

When the cover is closed on the housing, with the first magnet in close proximity to the non-ferrous portion of the case, such that the poles are in opposing position and establish the repulsion force, the first magnet is forced against the saddle and the saddle depresses the actuator on the switch, enabling the equipment to be started.

For this to occur, the first and second magnets must both include at least three poles. If a simple bar magnet, or a two-pole magnet is placed over the non-ferrous portion of the case, in an attempt to defeat the safety control and to operate the switch without closing the cover, the force which is created is counteracted by the inter-reaction of the saddle and adjacent ribs. The saddle pivots on the actuator and binds against the internal ribs and thereby fails to actuate the switch.

In addition to its use in safety or interlock systems, the magnetically operated switches have special utility in controls for machines which require liquid-tight enclosure of electrical devices. The switch or switches may be encased, with a first control magnet as mentioned, and the second or operating magnet can be mounted outside the case for rotary or sliding movement over a non-ferrous case portion, to establish a unique field which will directly repel (or attract) the first magnet to operate the switch.

It is therefore an object of the present invention to provide a magnetic interlock system which is not capable of being defeated by a single or by a two-pole magnet; to provide a magnetic control switch which is water-tight; and to provide a system in which a first magnet is received on a saddle within a water-tight case, in which the saddle pivots on the actuator for a switch and cooperates with guide means within the case to withstand magnetic force established by a single or a two-pole magnet outside the case.

These and other objects and advantages will become apparent from the following description, the accompanying drawing and the appended claims.

BRIEF DESCRIPTION OF DRAWING

FIG. 1 is a partially cut-away perspective view of a food mixing machine which includes one embodiment of a magnetic interlock system of the present invention;

FIG. 2 is a view partially cut-away and in section, of the water-tight case with the first magnet and saddle supported by the switch actuator;

FIG. 3 is a view taken along line 3—3 of FIG. 2, and showing the first magnet supported by the saddle within the upper section of the case;

FIG. 4 is a perspective view of the saddle used in accordance with the present invention;

FIG. 5 is a cut-away view, similar to that of FIG. 2, and showing the second magnet repulsing the saddle and first magnet to depress the actuator of the interlock switch;

FIG. 6 is a circuit diagram for the present invention;

FIG. 7 is a diagrammatic view of another embodiment, showing a means of slidably placing the second magnet's poles in opposing relation to the first magnet's poles; and FIG. 8 is a diagrammatic view showing a means of rotatably placing the second magnet's poles in opposing relation to the first magnet's poles.

DESCRIPTION OF THE PREFERRED EMBODIMENT

Referring to FIG. 1, a food mixing and grinding machine 10 of the type disclosed in U.S. Pat. No. 3,570,569, typical of the types of machines which require safety interlocks, includes a housing with a hopper 12 having flat end walls 13 and 14 and a pair of cooperating side walls 15 and 16 defining a generally semi-cylindrical mixing chamber 18. The side walls 15 and 16 are symmetrical and slope downwardly and inwardly to a horizontal trough 20 formed in the bottom of the hopper 12. The hopper 12 is supported by legs 22 which engage the floor.

A mixing member 24 is rotatably mounted between the end walls 13 and 14 and within the chamber 18 and includes a plurality of mixing arms 25 with curved extensions or scoops 26 arranged to mix material placed within the hopper. A horizontal discharge screw (not shown) is rotatably mounted within the trough 20 and has a forward end extending into a grinder barrel 28 mounted on a lower portion of the forward end wall 13. Material mixed in the hopper 12 by the mixing arms 25 descends into the trough 20, and the discharge screw forces the material through a grinder plate or the like 29 within the barrel 28.

The machine 10 is provided with a reversible motor 30 which, as disclosed in the above patent, is adapted to rotate the mixing member 24 and the discharge screw (when the motor rotates in one direction) to discharge material from the hopper 12, or to rotate only the mixing member 24 (when the motor rotates in the other direction) to mix material without discharging it from the hopper. The motor 30 is operated by an on-off switch 31 mounted on a gear cover 32 attached to the side wall 16. The reversing controls are omitted for simplicity.

A cover 35 is hinged to the side wall 15 by hinges 36 and is movable by means of a handle 37 between an operative closed position covering the hopper 12 and an inoperative raised position (FIG. 1) for loading the hopper 12. When the cover is closed, a lip 38 on the forward edge thereof overlaps a corresponding lip 39 on the forward edge of side wall 16.

In accordance with the invention, a liquid-tight case 40 (FIG. 2) is attached to the side wall 16 and defines a chamber 42 with an open upper end. The lower section 41 is secured to the inside of side wall 16 by bolts (not shown) extending through apertures 43. A cooperating upper section 44 closes the chamber 42 and is secured to the lower section 41 by horizontal bolts 46 retaining a gasket 47 therebetween. The lower section 41 has an internally threaded socket portion 48 receiving a threaded plug 50 with an electrical cable 51 sealed therein and connected to the on-off switch 31 mounted on the gear cover 32.

Referring to FIGS. 2–3, the upper section 44 includes a generally horizontal and rectangularly shaped non-ferrous portion 54 surrounded by a sealing ring 56 fitted within a rectangular grooved shoulder 58 offset below the upper surface 59 of the portion 54. When the housing 40 is secured to the side wall 16, the non-ferrous portion 54 is fitted within an aperture 60 in the lip 39. In this position, the sealing ring 56 abuts the lower surface of the lip 39, and the upper surface 59 of portion 54 forms a continuation of the upper surface of lip 39. The invention requires that at least the portion 54 be constructed of a non-ferrous material, preferably plastic, and in the preferred embodiment both sections 41 and 44 are constructed entirely of molded plastic material.

An interlock switch 62 with a movable actuator 63 is mounted within the case 40 and is conveniently secured to a depending support 64 (FIG. 3), partially seen in FIG. 2 (dotted lines), integrally molded with the upper section 44 and disposed within the chamber 42 of the lower section 41. The interlock switch 62 is operatively connected to the on-off switch 31 on the gear cage 32 by lead lines 66 from the cable 51.

A saddle 68 (FIG. 2) is disposed generally within the upper section 44 and supports a generally rectangular magnet 70 having at least three poles alternately arranged along its upper operative surface 71. Referring to FIG. 4, the saddle 68 includes an elongated base portion 72 having vertical arm portions 73 at each end thereof, and a pair of horizontally-spaced and later-cross portions 74. The cross portions 74 each include an arm 75 having an L-shaped cross-sectional configuration on one side of portion 72 and an arm 76 having a rectangular configuration on the other side thereof. The arms 75 are preferably connected by a bridge member 77.

The saddle 68 and accompanying magnet 70 are mounted within the upper section 44 on the actuator 63, and the switch 62 is positioned within the chamber 42 such that the actuator 63 engages the saddle 68 at the approximate midpoint of the base portion 72. The weight of the saddle and magnet combination is insufficient to operate the actuator 63, and thus the combination is free to pivot on the actuator 63.

The magnet 70 may be moved between an inoperative position resting on the actuator 63 (FIG. 2) and an operative position depressing the actuator 63 (FIG. 5), as described below. Its movement is guided within the housing 40, with reference to FIGS. 2–3, by a series of six internal ribs 80 integrally molded with the upper section 44 and having vertical edges 81 for slidably engaging and guiding the saddle 68. The edges 81 are disposed in close proximity to the arms 73, the L-shaped arms 75, and the rectangular arms 76, respectively, and serve to guide the movement of saddle 68 and the first magnet 70 in the vertical direction.

A second rectangular magnet 85 has at least three poles (of corresponding alternating polarity with the poles of the first magnet 70) arranged on its lower surface 86. The magnet 85 is mounted in a housing 88 rigidly bolted to the cover 35 in a position such that, when the cover 35 is seated on the hopper 12 in closed position, the poles of magnet 85 overlie the non-ferrous portion 54 of the housing 40 in a position opposite the corresponding poles of the first magnet 70. This establishes a repulsion force effective to move the first magnet 70 directly against the saddle 68, which in turn depresses the actuator 63 to actuate the switch 62 (FIG. 5).

Thus, as shown in the circuit diagram of FIG. 6, it can be seen that, once the on-off switch 31 has been depressed, the motor 30 cannot be started until the cover 35 has been closed to actuate the switch 62.

The construction is especially designed to withstand the magnetic repulsion force brought to bear by a single or two-pole magnet, if positioned on the lip 39 in overlying relation to the non-ferrous portion 54 of the case 40. For example, referring to FIG. 2, when a two pole magnet is moved along the upper surface 59 of the portion 54, it creates a repulsion force which is ineffective to move the first magnet 70 with sufficient force to depress the actuator 63. Rather, the arrangement within the upper section 44 permits the first magnet 70 and its associated saddle 68 to rock about the actuator 63 which acts as a pivot under the off-center influence of the repulsion force of the two-pole magnet. The actuator 63 permits the magnet and saddle combination to pivot to the right or to the left, depending upon the repulsive lines of force, and the ribs 80 provide sufficient clearance and guidance with the opposing arms of the saddle 68 such that the combination becomes cocked or binds in a position in which the repulsion force fails to operate the actuator.

The first magnet 70 can be properly repulsed only by another multi-pole magnet having at least three poles of corresponding opposing polarity. And, since such magnets are not as readily available as single or two-pole magnets, and the polarity arrangement cannot readily be determined with the magnet 70 encased, the invention substantially decreases the likelihood that the system will be defeated. It therefore provides greater safety than has heretofore been possible.

The foregoing description of a preferred embodiment of the invention has been with reference to its use in safety interlock devices for various machines, and in particular a switch for such an interlock device in which the two magnets are moved toward and away from each other as a cover or the like is opened and closed. However, the invention is not limited to such an arrangement, and a magnetically controlled switch may be provided in which the second or operating magnet slides and/or rotates into the proper polarity opposition relationship with the first magnet in the switch case. This arrangement may be used to perform a safety connection, for example as a latch is locked by sliding or rotational movement, or it may be used merely as a convenient liquid-tight switch control, wherein the intervening non-ferrous portion of the switch case provides a water tight seal. Such a feature may be of particular advantage in food handling machinery or the like where the controls of the machinery must be capable of withstanding direct application of streams of cleansing water.

For example, referring to FIG. 7, a first magnet 70a is attached to the outer surface of hopper side walls near the cover lip, and a second magnet 85a is slidably mounted on a cover such that, when the cover is closed, a switch is actuated by sliding the second magnet 85a horizontally over the first magnet 70a to a position in which the repulsion force would be established and actuate the switch. Referring to FIG. 8, a second magnet 85b is rotatably mounted over the control switch case and is rotated to a position over a first magnet 70b to actuate an internal switch which is totally enclosed within the case.

In either of these embodiments, as well as in the first described embodiment, a particular "keyed" arrangement of the magnet poles provides a remote or indirect switch operation which is liquid-tight, provides a completely sealed switch system, and accordingly may be used on many appliances such as food mixing machines, dishwashing machines and the like in which water would otherwise be apt to come into contact with the switch. The details of the switch, its operator, the saddle carrier for the encased magnet, etc., can all be essentially as shown in FIGS. 2–5.

While the forms of apparatus herein described constitute preferred embodiments of the invention, it is to be understood that the invention is not limited to these precise forms of apparatus, and that changes may be made therein without departing from the scope of the invention.

What is claimed is:

1. Apparatus for indirectly actuating a switch comprising a case having at least a non-ferrous portion through which magnetic lines of force can permeate, switch means mounted in said case and including a movable actuator, a first magnet inside said case and having at least three poles of alternating polarity, means mounting said first magnet in said case adjacent said actuator for limited movement relative to said non-ferrous case portion and to said actuator, a movable second magnet outside said non-ferrous case portion and having at least three poles of corresponding alternating polarity with the poles of said first magnet, said poles and said mounting means being arranged to establish a force effective to move said mounting means against said actuator to operate said switch only when said second magnet is moved to a position in close proximity with said non-ferrous case portion and with its poles correctly aligned opposite the poles of said first magnet, and guide means preventing correct motion of said actuator, and thus preventing operation of said switch, when another magnet having a lesser number of poles from said first magnet is brought to said position of close proximity.

2. The apparatus of claim 1 wherein said first and second magnets are polarized bar magnets and include operative surfaces, said poles of alternating polarity being located in said magnets adjacent said operative surfaces.

3. The apparatus of claim 1 wherein said case is liquid-tight.

4. Apparatus for indirectly actuating a switch comprising a case having at least a non-ferrous portion through which magnetic lines of force can permeate, switch means mounted in said case and including a movable actuator, a first magnet inside said case and having at least three poles of alternating polarity, saddle means mounting and supporting said first magnet in said case adjacent said actuator for limited movement relative to said non-ferrous housing portion and to said actuator, a movable second magnet outside said non-ferrous case portion and having at least three poles of corresponding alternating polarity with the poles of said first magnet, said poles being arranged to establish a force effective to move said first magnet against said actuator to operate said switch only when said second magnet is moved to a position in close proximity with said non-ferrous case portion and with its poles correctly aligned opposite the poles of said first magnet, means including said actuator forming a support connection enabling said saddle to rest on said actuator, and guide means within said case permitting said saddle and first magnet to move with respect to said actuator without actuating said switch under the influence of an exterior magnet having less than the proper corresponding number of poles.

5. The apparatus of claim 4 wherein said guide means includes a plurality of vertical arms on said saddle and a corresponding plurality of ribs on said case, said ribs having vertical edges disposed adjacent said vertical arms effective to guide said first magnet against said actuator under the influence of said second magnet and effective to cause said first magnet to bind in said case without operating said switch under the influence of a magnet having less than three poles.

6. The apparatus of claim 4 wherein said support connection of said saddle on said actuator is located at the longitudinal center of said first magnet.

7. In an appliance having a pair of closing parts including a cover mounted for seating on a housing, and including a driven member in said housing and a motor connected for driving said driven member; an improved magnetic interlock system comprising a case mounted on one of said parts and having at least a non-ferrous portion through which magnetic lines of flux may permeate, a first magnet with at least three poles mounted in said case for movement between a retracted position adjacent said non-ferrous case portion and an extended position spaced from said non-ferrous case portion, a switch secured within said case and connected to control said motor, said switch being positioned for actuation by said first magnet upon movement thereof to its extended position, a second magnet with at least three poles mounted on the other of said parts, said poles of said first and second magnets being of related alternating polarity, and said second magnet being positionable when said cover is seated on said housing over said non-ferrous case portion with its poles in alignment with those poles of said first magnet to establish a force effective to move said first magnet to its extended position to actuate said switch and enable said appliance to be operated, and guide means preventing movement of said first magnet to its extended position, and thus preventing actuation of said switch, when another magnet having a lesser number of poles from said first magnet is brought to said position over said non-ferrous case portion.

8. The appliance of claim 7 wherein said case with said first magnet therein is mounted on said housing, wherein said second magnet is carried by said cover, and said second magnet is effective to repel said first magnet in response to seating said cover on said housing.

9. The appliance of claim 7 wherein said case with said first magnet is mounted on said housing, wherein said second magnet is slidably supported on said cover, and said second magnet is slidably positionable to repulse said first magnet when said cover is seated on said housing.

10. The appliance of claim 7 wherein said case with said first magnet therein is mounted on said housing, wherein said second magnet is rotatably mounted on said cover, and said second magnet is rotatably positionable to move said first magnet to a switch operating position when said cover is seated on said housing.

11. A liquid-tight electrical switch control comprising a switch having an actuator,
a liquid-tight case enclosing said switch and having a portion of one wall thereof of non-ferrous material so as not to interfere with magnetic lines of force,
a first magnet of at least three poles movably mounted in said case directly behind said non-ferrous portion and arranged to operate said actuator,
a second magnet outside said case and having a number of poles at least equal to said first magnet to create a direct force with each and every pole of said first magnet only in a predetermined orientation of said second magnet on the outside of said non-ferrous portion, and
means restraining said first magnet against movement sufficient to operate said actuator except in response to such direct force, and said restraining means preventing movement sufficient to operate said actuator when another magnet having a lesser number of poles from said first magnet is brought to said position of close proximity.

12. A switch control as defined in claim 11, including means supporting said second magnet for movement toward and away from an operative position in proper predetermined orientation to said non-ferrous case portion to control actuation of said switch.

13. A switch control as defined in claim 12, wherein said supporting means is part of a protective device for a machine controlled by said switch.

14. A switch control as defined in claim 12, wherein said supporting means moves said second magnet in a sliding direction into and out of said proper orientation.

15. A switch control as defined in claim 12, wherein said supporting means moves said second magnet rotatably into and out of said proper orientation.

References Cited

UNITED STATES PATENTS

| | | | |
|---|---|---|---|
| 2,896,043 | 7/1959 | Andrews | 335—207 |
| 2,600,581 | 6/1952 | Schenendorf | 335—207 |
| 3,397,372 | 8/1968 | Maxwell | 335—206 X |

OTHER REFERENCES

"Interlock Switch;" Keller et al.; IBM Technical Disclosure Bulletin; vol. 10, No. 12, May 1968, p. 1926.

ROY N. ENVALL, JR., Primary Examiner